United States Patent
Huang

(10) Patent No.: US 9,639,485 B2
(45) Date of Patent: May 2, 2017

(54) METHOD AND APPARATUS FOR TRANSMITTING DATA IN ANDROID PLATFORM BASED TERMINAL DEVICE

(71) Applicant: HISENSE MOBILE COMMUNICATIONS TECHNOLOGY CO., LTD., Shandong (CN)

(72) Inventor: Lingang Huang, Qingdao (CN)

(73) Assignees: HISENSE MOBILE COMMUNICATIONS TECHNOLOGY CO., LTD., Qingdao (CN); HISENSE USA CORPORATION, Suwanee ( * ) Notice: Subject to any disclaimer, the term of this patent is extended or adjusted under 35 U.S.C. 154(b) by 0 days.

(21) Appl. No.: 14/351,538
(22) PCT Filed: Oct. 24, 2013
(86) PCT No.: PCT/CN2013/085892
§ 371 (c)(1),
(2) Date: Apr. 11, 2014
(87) PCT Pub. No.: WO2014/071804
PCT Pub. Date: May 15, 2014

(65) Prior Publication Data
US 2015/0339242 A1    Nov. 26, 2015

(30) Foreign Application Priority Data
Nov. 9, 2012    (CN) .......................... 2012 1 0447878

(51) Int. Cl.
*G06F 3/00*    (2006.01)
*G06F 5/00*    (2006.01)
(Continued)

(52) U.S. Cl.
CPC ............ *G06F 13/102* (2013.01); *G06F 13/38* (2013.01); *G06F 13/4282* (2013.01)

(58) Field of Classification Search
CPC ............. G06F 9/45554; G06F 11/1482; G06F 2201/815
(Continued)

(56) References Cited

U.S. PATENT DOCUMENTS

2004/0044819 A1*    3/2004    Jeon ...................... G06F 13/385
                                                        710/305
2008/0153548 A1*    6/2008    Shin ..................... G06F 13/102
                                                        455/559
(Continued)

FOREIGN PATENT DOCUMENTS

CN    101163155 A    4/2008
CN    101589592 A    11/2009
(Continued)

OTHER PUBLICATIONS

Phil Nickinson,"Android 101: Copy files to your storage card in Window, Friday ,Feb. 5, 2010." http://www.androidcentral.com/android-101-copy-files-your-storage-card-windows.*
(Continued)

*Primary Examiner* — Idriss N Alrobaye
*Assistant Examiner* — Getente A Yimer

(57) ABSTRACT

A method and apparatus for transmitting data in an Android platform based terminal device are provided. In the method, when the terminal device establishes a connection for data transmission with another device over a USB, the terminal device transmits data in an internal storage of the terminal device to the another device based upon a file transfer protocol and receives and writes into the internal storage data transmitted from the another device based upon the file transfer protocol; and the terminal device transmits data in an external storage of the terminal device to the another device in a UMS mode and receives and writes into the external storage data transmitted from the another device in the UMS mode.

7 Claims, 2 Drawing Sheets

(51) Int. Cl.
*G06F 13/12* (2006.01)
*G06F 13/38* (2006.01)
*G06F 12/00* (2006.01)
*G06F 12/14* (2006.01)
*G06F 13/36* (2006.01)
*G06F 13/10* (2006.01)
*G06F 13/42* (2006.01)

(58) Field of Classification Search
USPC .................................. 710/74, 3, 52, 200, 310
See application file for complete search history.

(56) References Cited

U.S. PATENT DOCUMENTS

| | | | | |
|---|---|---|---|---|
| 2010/0185808 | A1* | 7/2010 | Yu ........................ | G06F 13/1684 711/103 |
| 2012/0110220 | A1* | 5/2012 | Miyano ................. | G06F 13/385 710/33 |
| 2013/0227177 | A1* | 8/2013 | Cho ..................... | G06F 11/3051 710/16 |
| 2013/0297835 | A1* | 11/2013 | Cho .................. | H04M 1/72527 710/14 |
| 2014/0115202 | A1* | 4/2014 | Yoshinaga ............ | G06F 13/426 710/62 |

FOREIGN PATENT DOCUMENTS

CN          102981990 A       3/2013
WO     WO 2009/151262 A2    12/2009

OTHER PUBLICATIONS

Jerry Hildenbrand,"Ice Cream Sandwich explained: MTP—what is it, why use it, and how to set it up, Friday, Nov. 25, 2011." http://www.androidcentral.com/ics-feature-mtp-what-it-why-use-it-and-how-set-it.*
International Search Report for PCT/CN2013/085892 filed on Oct. 24, 2013.

* cited by examiner

METHOD AND APPARATUS FOR TRANSMITTING DATA IN ANDROID PLATFORM BASED TERMINAL DEVICE

The present application is a US National Stage of International Application No. PCT/CN2013/085892, filed Oct. 24, 2013, designating the United States, and claiming priority to Chinese Patent Application No. 201210447878.0, entitled "method and apparatus for transmitting data in Android platform based terminal device", filed with the State Intellectual Property Office of People's Republic of China on Nov. 9, 2012, the content of which is incorporated herein by reference in its entirety.

FIELD

The present invention relates to the field of communications and particularly to a method and apparatus for transmitting data in an Android platform based terminal device.

BACKGROUND

Android platform based terminal devices (e.g., smart phones, tablet computers, etc.) become increasingly popular along with rapid development of intelligent terminal devices. Android is a Linux platform-based open-source handset operating system, and the Android platform is composed of an operating system, a middleware, a user interface and applications, where an underlying layer of the platform is based upon a Linux kernel developed in the C language and serves only fundamental functions, a middle layer of the platform includes a function library and a virtual machine, and an upper layer of the platform includes various applications.

At present, an Android platform based terminal device is connected to a Personal Computer (PC) through a Universal Serial Bus (USB) connection line, and then a data transmission scheme as adopted is typically either the Media Transfer Protocol (MTP) or USB Mass Storage (UMS), and these two data transmission schemes of MTP and UMS are used or present alone.

After the Android platform based terminal device is connected to the PC through the USB connection line, it transmits and shares data with the PC in the following two implementation schemes: in one of the implementation schemes, the MTP file transmission technology is adopted alone to enable the PC to share both an internal storage of the terminal device (a storage partitioned using a File Allocation Table (FAT) or a storage partitioned using the Fourth Extended File System (Ext4)) and an external storage (e.g., a Secure Digital Memory Card (simply an SD card)) (typically FAT-partitioned) or to share either the internal storage or the external SD card memory; and in the other implementation scheme, the UMS scheme is adopted alone for data transmission to enable the PC to share both the FAT-partitioned internal storage of the terminal device and the external SD card memory or to share either the FAT-partitioned internal storage of the terminal device or the external SD card memory.

In the scheme of transmitting and sharing data with use of the MTP file transmission technology alone, the terminal device allocates, as much as possible, the internal storage to the Android system for use, but due to the limitation of the file transfer protocol of the MTP itself, transmission and sharing of data between the PC and the terminal device through the USB connection is limited to transmission of only a file, and the PC can not control in real-time the contents of the internal storage of the terminal device, for example, the PC can not modify the file.

In the scheme of transmitting and sharing data with use of the UMS mode alone, both the internal storage in the terminal device and the external SD card memory share data with the PC in the UMS mode, but due to that the terminal device allocates a part of a storage space in the internal storage as an FAT partition while establishing the USB connection with the PC, and this part of partition can not be used to run an upper application of the terminal device, the size of the standard Ext4 partition, in the internal storage of the terminal device, available to the system may be lowered to some extent.

SUMMARY

A method and apparatus for transmitting data in an Android platform based terminal device are provided so as to perform both the function of data transmission based upon a file transfer protocol and the function of data transmission based upon the USB mass storage mode on the Android platform based terminal device while making use of advantages of both the data transmission schemes.

Some technical solutions according to embodiments of the present invention are as follows.

A method of transmitting data in an Android platform based terminal device includes:

when the terminal device establishes a connection for data transmission with another device over a Universal Serial Bus, USB, the terminal device transmitting data in an internal storage of the terminal device to the another device based upon a file transfer protocol and receiving and writing into the internal storage data transmitted from the another device based upon the file transfer protocol; and the terminal device transmitting data in an external storage of the terminal device to the another device in a USB Mass Storage, UMS, mode and receiving and writing into the external storage data transmitted from the another device in the UMS mode.

An apparatus for transmitting data in an Android platform based terminal device includes:

a first data transmitting component configured, when the terminal device establishes a connection for data transmission with another device over a Universal Serial Bus, USB, to transmit data in an internal storage of the terminal device to the another device based upon a file transfer protocol and to receive and write into the internal storage data transmitted from the another device based upon the file transfer protocol; and a second data transmitting component configured, when the terminal device establishes a connection for data transmission with another device over the Universal Serial Bus (USB), to transmit data in an external storage of the terminal device to the another device in a USB Mass Storage, UMS, mode and to receive and write into the external storage data transmitted from the another device in the UMS mode.

Based upon the foregoing technical solution, in the embodiments of the invention, when an Android platform based terminal device establishes a connection for data transmission with another device over a USB, the terminal device transmits data in an internal storage of the terminal device to the another device based upon a file transfer protocol and receives and writes into the internal storage data transmitted from the another device based upon the file transfer protocol, and also transmits data in an external storage of the terminal device to the another device in a USB Mass Storage (UMS) mode and receives and writes into the external storage data transmitted from the another device in the UMS mode, so that both the function of data transmission based upon the file transfer protocol and the function of data transmission based upon the USB mass storage mode can be performed on the Android platform based terminal device while making use of advantages of both the data transmission schemes.

DETAILED DESCRIPTION OF THE EMBODIMENTS

In order to make it possible to perform both the function of data transmission based upon a file transfer protocol and the function of data transmission based upon the USB mass storage mode in an Android platform based terminal device, an embodiment of the invention provides a method of transmitting data in the Android platform based terminal device.

In the following embodiments, a terminal device refers to an Android platform based terminal device, e.g., an Android platform based smart phone, tablet computer, etc. The terminal device includes an internal storage and an external storage attached to the terminal device (e.g., an external SD card memory attached to the smart phone).

In the following embodiments, another device refers to a device provided with a USB interface via which data can be transmitted, where the device supports a file transfer protocol as well, e.g., a Windows operating system based PC or the like.

In the following embodiments, the file transfer protocol includes but will not be limited to the Media Transfer Protocol (MTP) or the Picture Transfer Protocol (PTP). In an application, another file transfer protocol which is supported by the Android platform based terminal device and another device USB-connected with the terminal device is also applicable in the present invention, and it will also be encompassed in the embodiments of the present invention.

An embodiment of the invention will be introduced below with reference to the drawings.

Figure 1:
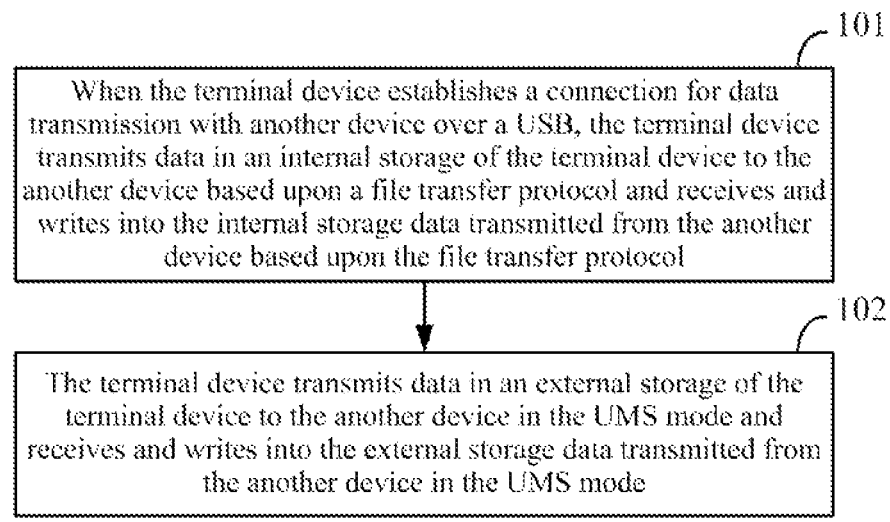
FIG. 1 is a flow chart of a method of transmitting data in a terminal device according to an embodiment of the invention.

As illustrated in FIG. 1, in an embodiment of the invention, a flow of a method of transmitting data in an Android platform based terminal device is as follows:

Operation 101, when the terminal device establishes a connection for data transmission with another device over a USB, the terminal device transmits data in an internal storage of the terminal device to the another device based upon a file transfer protocol and receives and writes into the internal storage data transmitted from the another device based upon the file transfer protocol.

In an application, the function of transmitting data with the another device connected over the USB based upon the file transfer protocol is performed in an Android kernel of the terminal device; and the function of transmitting data with the another device connected over the USB based upon the UMS mode is performed in the Android kernel of the terminal device.

When the function of transmitting data with the another device connected over the USB based upon the file transfer protocol is performed in the Android kernel of the terminal device, one implementation thereof will be described in the embodiment of the invention by way of an example, and an application thereof will not be limited thereto, and other implementations thereof will be also encompassed in the embodiments of the invention.

In an implementation, the terminal device transmits data in the internal storage of the terminal device to the another device based upon the file transfer protocol and receives and writes into the internal storage data transmitted from the another device based upon the file transfer protocol particularly as follows:

the terminal device creates a virtual storage in a File System in User space (FUSE) above the Fourth Extended File System (Ext4) adopted by the internal storage, where the virtual storage is used to run an Android application and to storage data, and the terminal device transmits data in the virtual storage to the another device based upon the file transfer protocol and receives and writes into the virtual storage data transmitted from the another device based upon the file transfer protocol.

Operation 102: The terminal device transmits data in an external storage of the terminal device to the another device in the UMS mode and receives and writes into the external storage data transmitted from the another device in the UMS mode.

When the function of transmitting data with the another device connected over the USB based upon the UMS mode is performed in the Android kernel of the terminal device, one implementation thereof will be described in the embodiment of the invention by way of an example, and an application thereof will not be limited thereto, and other implementations thereof will be also encompassed in the embodiments of the invention.

In an implementation, the terminal device transmits data in the external storage of the terminal device to the another device in the UMS mode and receives and writes into the external storage data transmitted from the another device in the UMS mode as follows: the terminal device unmounts the external storage over an Android platform and attaches the external storage to the another device as a USB mass storage device; and the terminal device transmits data in the USB mass storage device to the another device in the UMS mode and receives and writes into the USB mass storage device data transmitted from the another device in the UMS mode.

In an implementation thereof, the terminal device firstly unmounts the external storage at an Android framework layer; and then sets the external storage as a USB mass storage device by invoking an enableUSBMassStorage function in a StorageManager class through a UsbDeviceManager class at the framework layer; and attaches the external storage to the another device, connected with the terminal device over the USB, in an external storage management process for management of the external storage, e.g., a Vold daemon process.

Figure 2:
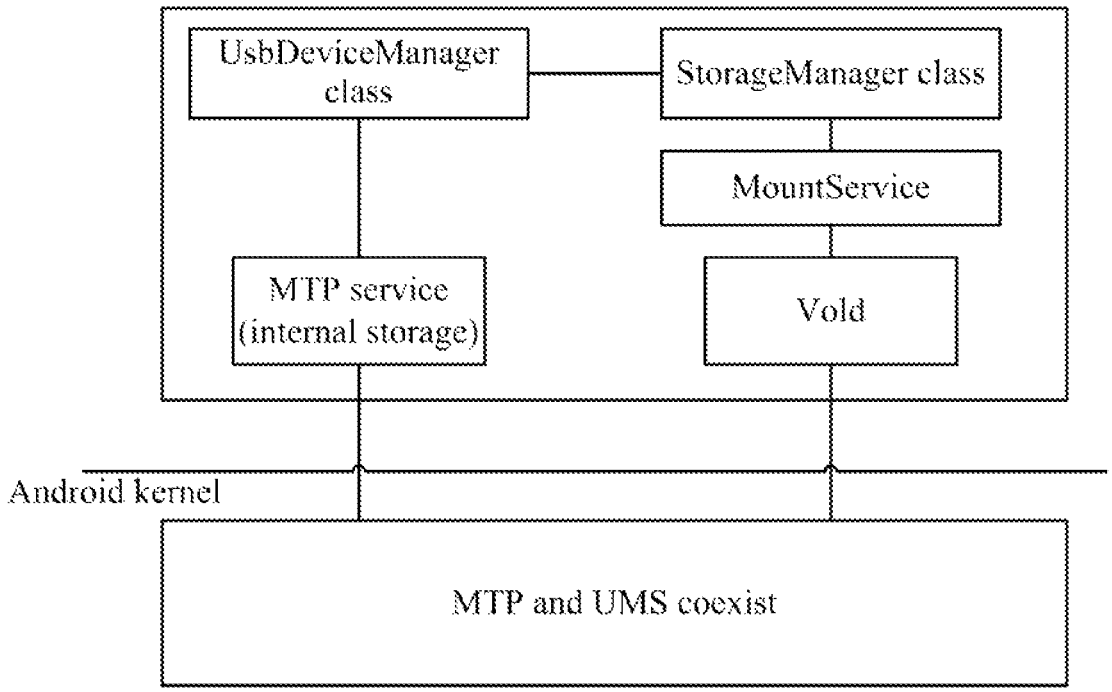
FIG. 2 is a schematic diagram of an implementation of transmitting data in a terminal device according to an embodiment of the invention.

An implementation of transmitting data in an Android platform based terminal device according to the present invention will be introduced below in an embodiment of the present invention with reference to FIG. 2.

First, the functions of transmitting data through both the MTP (or the PTP) and the UMS are performed in the Android kernel of the terminal device; and Second, when the terminal device is connected with a PC through a USB connection line and performs data transmission, the Android kernel of the terminal device enables the functions of transmitting data through both the MTP (or the PTP) and the UMS (the processes of transmitting and sharing MTP data of both the internal storage and an SD card are included in an MTP service after startup), and the SD card attached to the terminal device is handled as follows at the Android framework layer of the terminal device:

the SD card is unmounted, and the enableUSBMassStorage function in the StorageManager class is invoked through the UsbDeviceManager class at the framework layer, and with this function, the SD card is set as a USB mass storage device, and a MountService is invoked to start a Volume Daemon (Vold) for management of the external storage to attach the SD card to the PC, and correspondingly the processes of transmitting and sharing MTP type data of the SD card in the MTP service is removed, and thus the functions of data transmission of both the MTP and the UMS can coexist in the same terminal device.

Figure 3:
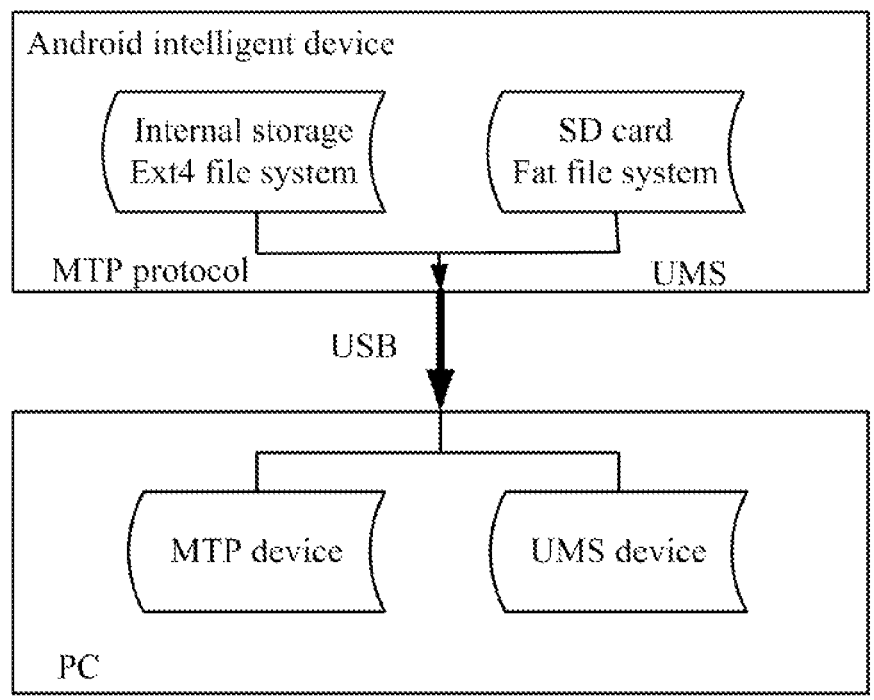
FIG. 3 is a schematic diagram of transmitting data in a terminal device according to an embodiment of the invention.

By way of an example of an Android intelligent device including an internal storage and an external SD card, the internal storage of the Android intelligent device is embodied as an Ext4 file system, and the attached SD card is embodied as a File Allocation Table (FAT) file system, and the Android intelligent device establishes a USB connection with the PC which supports the types of data transmission of both the MTP and the UMS. With the foregoing method of transmitting data according to the embodiment of the invention, the data transmissions scheme as illustrated in FIG. 3 can be performed, where the internal storage of the Android intelligent device transmits data with the PC side using the MTP protocol, and the SD card transmits data with the PC side in the UMS mode, that is, the PC side identifies the internal storage of the Android intelligent device as an MTP device driven in the MTP protocol and identifies the SD card as a USB-driven UMS device.

Figure 4:
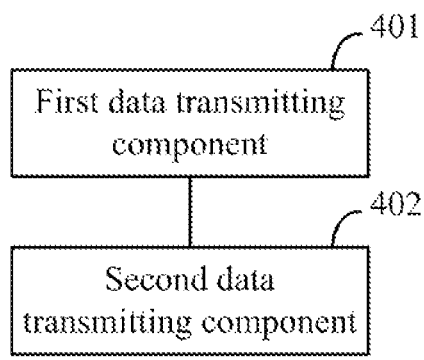
FIG. 4 is a schematic structural diagram of an apparatus for transmitting data in a terminal device according to an embodiment of the invention.

Based upon the same inventive idea, as illustrated in FIG. 4, an embodiment of the invention further provides an apparatus for transmitting data in an Android platform based terminal device, and reference can be made to the implementation of the foregoing method for an implementation of the apparatus, and a repeated description thereof will be omitted here, and the apparatus generally includes the following components.

A first data transmitting component 401 is configured, when the terminal device establishes a connection for data transmission with another device over a Universal Serial Bus (USB), to transmit data in an internal storage of the terminal device to the another device based upon a file transfer protocol and to receive and write into the internal storage data transmitted from the another device based upon the file transfer protocol; and A second data transmitting component 402 is configured, when the terminal device establishes a connection for data transmission with another device over the Universal Serial Bus (USB), to transmit data in an external storage of the terminal device to the another device in a USB Mass Storage (UMS) mode and to receive and write into the external storage data transmitted from the another device in the UMS mode.

The first data transmitting component is further configured:

to create a virtual storage in a File System in User space (FUSE) above the Fourth Extended File System (Ext4) adopted by the internal storage, where the virtual storage is used to run an Android application and to storage data, and to transmit data in the virtual storage to the another device based upon the file transfer protocol and to receive and write into the virtual storage data transmitted from the another device based upon the file transfer protocol.

The second data transmitting component is further configured:

to unmount the external storage over an Android platform and to attach the external storage to the another device as a USB mass storage device; and to transmit data in the USB mass storage device to the another device in the UMS mode and to receive and write into the USB mass storage device data transmitted from the another device in the UMS mode.

In an implementation, the second data transmitting component is further configured:

to unmount the external storage at an Android framework layer; and to set the external storage as a USB mass storage device by invoking an enableUSBMassStorage function in a StorageManager class through a UsbDeviceManager class at the framework layer; and to attach the external storage to the another device in an external storage management process.

The file transfer protocol may at least be the MTP or the PTP.

Based upon the foregoing technical solution, in the embodiments of the invention, when an Android platform based terminal device establishes a connection for data transmission with another device over a USB, the terminal device transmits data in an internal storage of the terminal device to the another device based upon a file transfer protocol and receives and writes into the internal storage data transmitted from the another device based upon the file transfer protocol, and also transmits data in an external storage of the terminal device to the another device in the USB Mass Storage (UMS) mode and receives and writes into the external storage data transmitted from the another device in the UMS mode, so that both the function of data transmission based upon the file transfer protocol and the function of data transmission based upon the USB mass storage mode can be performed on the Android platform based terminal device while making use of advantages of both the data transmission schemes.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the another programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Evidently those skilled in the art can make various modifications and variations to the invention without departing from the essence and scope of the invention. Thus the invention is also intended to encompass these modifications and variations thereto so long as the modifications and variations come into the scope of the claims appended to the invention and their equivalents.

The invention claimed is:

1. A method of transmitting data in an Android platform based terminal device comprising:
   when the terminal device establishes a connection for data transmission with another device over a Universal Serial Bus (USB), the terminal device transmitting data in an internal storage of the terminal device to the another device based upon a file transfer protocol and receiving and writing into the internal storage data transmitted from the another device based upon the file transfer protocol; and
   the terminal device transmitting data in an external storage of the terminal device to the another device in a USB Mass Storage (UMS) mode and receiving and writing into the external storage data transmitted from the another device in the UMS mode,
   wherein the terminal device transmitting data in the external storage of the terminal device to the another device in the UMS mode and receiving and writing into the external storage data transmitted from the another device in the UMS mode comprises:
   the terminal device unmounting the external storage over an Android platform and attaching the external storage to the another device as a USB mass storage device; and
   the terminal device transmitting data in the USB mass storage device to the another device in the UMS mode and receiving and writing into the USB mass storage device data transmitted from the another device in the UMS mode, and
   wherein the terminal device unmounting the external storage over the Android platform and attaching the external storage to the another device as the USB mass storage device comprises:
   the terminal device unmounting the external storage at an Android framework layer, setting the external storage as the USB mass storage device by invoking an enableUSBMassStorage function in a StorageManager class through a UsbDeviceManager class at the framework layer, and attaching the external storage to the another device in an external storage management process.

2. The method of claim 1, wherein the file transfer protocol is a Media Transfer Protocol (MTP) or a Picture Transfer Protocol (PTP).

3. The method of claim 2, wherein the terminal device transmitting data in the internal storage of the terminal device to the another device based upon the file transfer protocol and receiving and writing into the internal storage data transmitted from the another device based upon the file transfer protocol comprises:
   the terminal device creating a virtual storage in a File System in User space (FUSE) above the Fourth Extended File System (Ext4) adopted by the internal storage, wherein the virtual storage is used to run an Android application and to storage data; and
   the terminal device transmitting data in the virtual storage to the another device based upon the file transfer protocol and receiving and writing into the virtual storage data transmitted from the another device based upon the file transfer protocol.

4. An apparatus for transmitting data in an Android platform based terminal device comprising:
   a first data transmitting component configured, when the terminal device establishes a connection for data transmission with another device over a Universal Serial Bus (USB), to transmit data in an internal storage of the terminal device to the another device based upon a file transfer protocol and to receive and write into the internal storage data transmitted from the another device based upon the file transfer protocol; and
   a second data transmitting component configured, when the terminal device establishes a connection for data transmission with another device over the USB, to transmit data in an external storage of the terminal device to the another device in a USB Mass Storage (UMS) mode and to receive and write into the external storage data transmitted from the another device in the UMS mode,
   wherein the second data transmitting component is further configured:
   to unmount the external storage over an Android platform and to attach the external storage to the another device as a USB mass storage device; and to transmit data in the USB mass storage device to the another device in the UMS mode and to receive and write into the USB mass storage device data transmitted from the another device in the UMS mode, and
   wherein the second data transmitting component is further configured:
   to unmount the external storage at an Android framework layer, to invoke an enableUSBMassStorage function in a StorageManager class through a UsbDeviceManager class at the framework layer to set the external storage as the USB mass storage device, and to attach the external storage to the another device in an external storage management process.

5. The apparatus of claim 4, wherein the file transfer protocol is a Media Transfer Protocol (MTP) or a Picture Transfer Protocol (PTP).

6. The apparatus of claim 4, wherein the first data transmitting component is further configured:
   to create a virtual storage in a File System in User space (FUSE) above the Fourth Extended File System (Ext4) adopted by the internal storage, wherein the virtual storage is used to run an Android application and to storage data, and to transmit data in the virtual storage to the another device based upon the file transfer protocol and to receive and write into the virtual storage data transmitted from the another device based upon the file transfer protocol.

7. The apparatus of claim 5, wherein the first data transmitting component is further configured:
  to create a virtual storage in a File System in User space (FUSE) above the Fourth Extended File System (Ext4) adopted by the internal storage, wherein the virtual storage is used to run an Android application and to storage data, and to transmit data in the virtual storage to the another device based upon the file transfer protocol and to receive and write into the virtual storage data transmitted from the another device based upon the file transfer protocol.

* * * * *